US009791277B2

(12) United States Patent
Hong et al.

(10) Patent No.: US 9,791,277 B2
(45) Date of Patent: Oct. 17, 2017

(54) APPARATUS AND METHOD FOR MEASURING VELOCITY OF MOVING OBJECT IN A NAVIGATION SYSTEM

(75) Inventors: Hyun-Su Hong, Seongnam-si (KR); Jin-Won Kim, Seoul (KR); Ji-Heon Oh, Yongin-si (KR); Jae-Myeon Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 2760 days.

(21) Appl. No.: 12/247,726

(22) Filed: Oct. 8, 2008

(65) Prior Publication Data

US 2009/0099765 A1    Apr. 16, 2009

(30) Foreign Application Priority Data

Oct. 9, 2007    (KR) .................. 10-2007-0101433

(51) Int. Cl.
  *G01C 21/16*    (2006.01)
(52) U.S. Cl.
  CPC .................. *G01C 21/16* (2013.01)
(58) Field of Classification Search
  USPC ........................................................ 701/200
  See application file for complete search history.

(56) References Cited

U.S. PATENT DOCUMENTS

| 7,747,383 | B2 | 6/2010 | Ohkubo et al. | |
|---|---|---|---|---|
| 2002/0069019 | A1* | 6/2002 | Lin | 701/301 |
| 2007/0067137 | A1 | 3/2007 | Ohkubo et al. | |
| 2008/0071475 | A1* | 3/2008 | Takaoka | 701/213 |

FOREIGN PATENT DOCUMENTS

| JP | 2003-075172 | 3/2003 |
|---|---|---|
| JP | 2007-101527 | 4/2007 |
| KR | 1020070027472 | 3/2007 |
| KR | 1020070027473 | 3/2007 |

OTHER PUBLICATIONS

Julier, S., "Sigma-Point Kalman Filters for Nonlinear Estimation and Sensor-Fusion," AIAA Guidance, Navigation, and Control Conference and Exhibit, Aug. 16-19, 2004.*

* cited by examiner

*Primary Examiner* — Lena Najarian
(74) *Attorney, Agent, or Firm* — The Farrell Law Firm, P.C.

(57) ABSTRACT

An apparatus and method for measuring a velocity of a moving object in a navigation system are provided, which can increase an accuracy of velocity measurement and position estimation of the moving object are provided. The apparatus includes a sensor part including an acceleration sensor for measuring acceleration of the moving object and outputting a corresponding acceleration measurement value, and includes an altimeter for measuring an altitude of the moving object and outputting a corresponding altitude measurement value; and a calculation part for calculating the velocity of the moving object by using the acceleration measurement value output from the acceleration sensor and the altitude measurement value output from the altimeter.

3 Claims, 5 Drawing Sheets

APPARATUS AND METHOD FOR MEASURING VELOCITY OF MOVING OBJECT IN A NAVIGATION SYSTEM

PRIORITY

This application claims priority under 35 U.S.C. §119(a) to an application entitled "Apparatus and Method for Measuring Velocity of Moving Object in Navigation System" filed in the Korean Industrial Property Office on Oct. 9, 2007 and assigned Serial No. 2007-101433, the contents of which are incorporated herein by reference.

BACKGROUND OF THE INVENTION

1. Field of the Invention

The present invention relates to an apparatus and method for measuring a velocity of a moving object in a navigation system, and more particularly to an apparatus and method for measuring a velocity of a moving object in a navigation system that can increase an accuracy of a velocity measurement and a position estimation of the moving object.

2. Description of the Related Art

A position-measuring device for obtaining the position of a moving object is installed in a navigation system of the moving object. Such position measuring devices are classified into one of two types: one type is for determining die position of a moving object using external assistance, and the other is for determining the position of a moving object using an internal system. The external assistance may be in the form of a Global Positioning System (GPS), and the internal system may be in the form of a Dead Reckoning (DR) system. The DR system is a system that calculates a velocity and position of the moving object using data measured by a sensor, such as an accelerometer, a gyroscope (hereinafter referred to as a "gyro"), etc.

FIG. 1 is a block diagram schematically illustrating a conventional apparatus for measuring a velocity of a moving object in a navigation system.

Referring to FIG. 1, the conventional velocity measuring apparatus includes a sensor part 10 and a calculation part 20. The sensor part 10 includes an accelerometer 14 for sensing a traveling acceleration and a traveling direction of a moving object. The sensor part 10 further includes a first gyro 12, and includes a second gyro 16 for sensing an inclination angle of an inclined surface on a traveling path of the moving object. The calculation part 20 includes a velocity calculation unit 22 for calculating a velocity of the moving object and a gravity component calculation unit 24.

The velocity of the moving object can be determined by combining velocity information obtained by the accelerometer 14 with direction information obtained by the first gyro 12. In order for a DR system, which includes an inertia sensor, to determine a traveling velocity vector of the moving object, the DR system is required to measure a traveling direction angle of the moving object and the velocity of the moving object in a traveling direction. In order to determine the traveling direction angle, the first gyro 12, which is installed on an axis that is perpendicular to a plane including an axis of rotation of an axle of the moving object, is required. Also, in order to determine the velocity in the traveling direction, in addition to the accelerometer 14 installed in an axle direction, the second gyro 16, which measures a road inclination angle corresponding to an angle of the plane placed on the axle, is required.

The road inclination angle is defined as an inclination angle against a plane that is perpendicular to a direction of gravity acceleration. The DR system removes a gravity acceleration component included in a measured value of the accelerometer 14 by measuring the road inclination angle.

If an axis direction of the accelerometer 14 installed in the moving object is not perpendicular to the direction of the gravity acceleration on a traveling path of the moving object, the value measured by the accelerometer 14 includes a part of the gravity acceleration component. The inclusion of such a gravity acceleration component causes a large error in measuring the velocity of the moving object. Accordingly, the DR system is provided with the second gyro 16, or an inclinometer, in order to remove the gravity component.

The direction of the gravity acceleration is always towards the center of the earth and perpendicular to the surface of the earth ellipsoid (i.e. spherical surface approximating the surface of the earth). In the DR system, when the axis direction of an accelerometer 14 mounted on a moving object (e.g., fixed, in a specified direction, to a car body) is changed due to the change of the road inclination angle, the DR system must remove the gravity component appearing at an output of the accelerometer 14 in order to determine a pure movement acceleration of the moving object. However, if information on the road inclination angle is not provided, it is impossible to discriminate between the movement acceleration in the traveling direction and the gravity acceleration component, and thus the pure velocity of the moving object cannot be determined.

As described above, in order to obtain the pure movement acceleration of the moving object in the DR system, a sensor for measuring the road inclination angle is required. In the conventional DR system, the second gyro 16 mainly serves as such a sensor. Since the gyros 12 and 16 are sensors for measuring a variation rate of a rotation angle, the road inclination angle can be obtained by integrating the output of the second gyro 16. The second gyro 16 has an advantage in that the second gyro 16 is suitable for tracking an instantaneous change of the inclination angle. However, an error component of the second gyro 16 is integrated in the process of obtaining the inclination angle, and thus an estimated error of the inclination angle measured by the second gyro 16 accumulates over time.

Accordingly, since the second gyro 16 has the disadvantage of error component accumulation, there is a need for a method of accurately measuring the inclination angle of a moving object without using the second gyro 16.

SUMMARY OF THE INVENTION

Accordingly, the present invention has been designed to solve the above and other problems occurring in the prior art, and an object of the present invention is to provide an apparatus and method for measuring velocity of a moving object in a navigation system that can heighten the accuracy of velocity measurement and position estimation of the moving object.

In order to accomplish the above and other objects, there is provided an apparatus for measuring a velocity of a moving object in a navigation system, according to the present invention, which includes a sensor part including an acceleration sensor for measuring acceleration of the moving object aid outputting a corresponding acceleration measurement value, and an altimeter for measuring an altitude of the moving object and outputting a corresponding altitude measurement value; and a calculation part for calculating the velocity of the moving object by using the acceleration measurement value output from the acceleration sensor and the altitude measurement value output from the altimeter.

In accordance with another aspect of the present invention, there is provided a method for measuring a velocity of a moving object in a navigation system, which includes measuring an acceleration and an altitude of the moving object; and calculating the velocity of the moving object by using an acceleration measurement value according to the measured acceleration of the moving object and an altitude measurement value according to the measured altitude of the moving object.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. Although a number of specific features such as detailed constituent elements are given in the following description of the present invention, they are presented for a better understanding of the present invention only. Also, it will be clear to those skilled in the art that such specific features can easily be changed or modified within the scope of the present invention. Additionally, a detailed description of known functions and configurations incorporated herein will be omitted when a detailed description may obscure the subject matter of the present invention.

Figure 1:
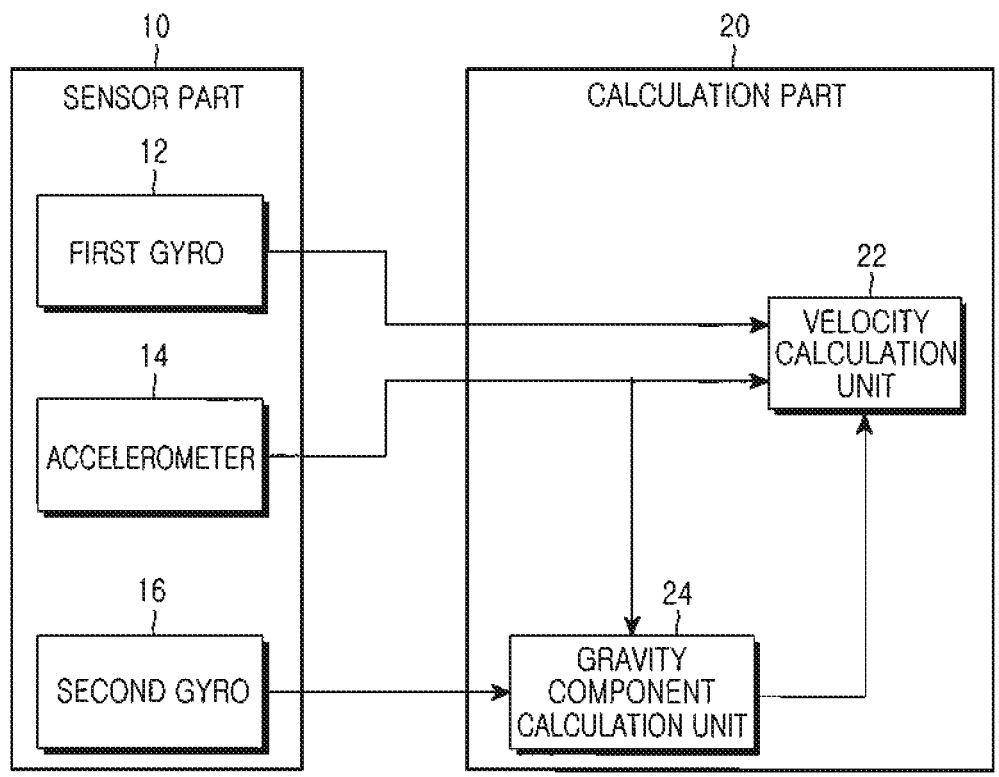
FIG. 1 is a block diagram illustrating a conventional apparatus for measuring velocity of a moving object in a navigation system.
Figure 2:
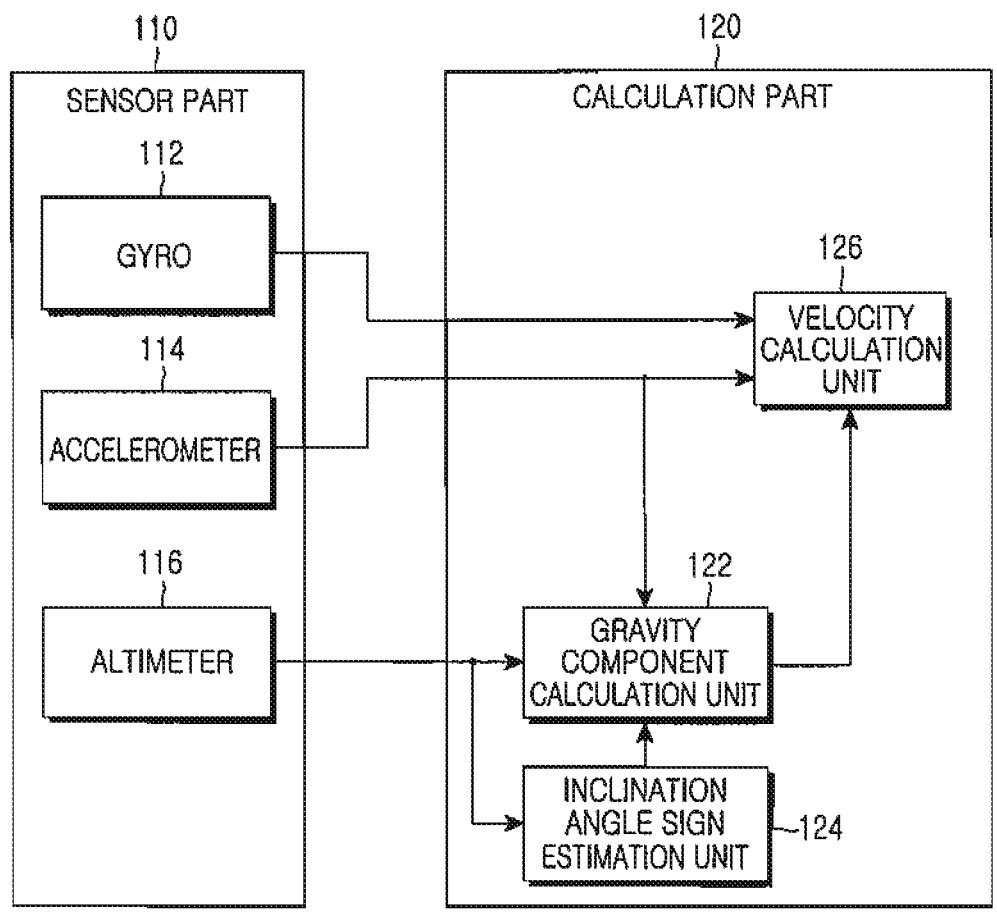
FIG. 2 is a block diagram illustrating an apparatus for measuring velocity of a moving object in a navigation system according to an exemplary embodiment of the present invention.

FIG. 2 is a block diagram illustrating an apparatus for measuring velocity of a moving object in a navigation system according to an exemplary embodiment of the present invention.

Referring to FIG. 2, an apparatus 100 for measuring velocity of a moving object in a navigation system includes a sensor part 110 and a calculation part 120.

The sensor part 110 includes at least one sensor, and measures acceleration and altitude of the moving object. For this, the sensor part 110 includes a gyro 112, an accelerometer 114, and an altimeter 116.

The accelerometer 114 senses the acceleration of the moving object, and outputs a corresponding acceleration measurement value. Since the moving object, which moves on an inclined surface, is affected by the earth's gravity, the acceleration measurement value output from the accelerometer 114 includes a gravity acceleration component, which is due to gravity, as explained hereinabove, in addition to a pure movement acceleration component due to the movement of the moving object.

The gyro 112 senses a traveling direction of the moving object, and measures a corresponding angular velocity of the moving object.

The altimeter 116 measures an altitude corresponding to a current position of the moving object, and outputs a corresponding altitude measurement value. According to an exemplary embodiment of the present invention, the altimeter 116 measures the altitude of the moving object for a predetermined period, and outputs the corresponding altitude measurement value.

The calculation part 120 calculates the velocity of the moving object by using the acceleration measurement value and the altitude measurement value measured by the sensor part 110. For this calculation, the calculation part 120 includes a gravity component calculation unit 122, an inclination angle sign estimation unit 124, and a velocity calculation unit 126.

The inclination angle sign estimation unit 124, when the moving object travels on an inclined surface, determines a sign of an inclination angle of the inclined surface.

When the moving object moves on the inclined surface, unlike cases where the moving object moves on a flatland, a gravity component, which acts in a direction perpendicular to the surface of the earth ellipsoid, is applied to the moving object in accordance with the inclination angle of the inclined surface. Accordingly, the gravity component is included in the movement acceleration of the moving object that is measured by the accelerometer 114, i.e., the acceleration measurement value measured on the inclined surface by the accelerometer 114 is not the pure acceleration of the moving object, but includes the gravity acceleration according to the inclination angle. Accordingly, in order to calculate the pure velocity of the moving object, the gravity acceleration that is the gravity component must be removed from the acceleration measurement value measured by die accelerometer 114.

The inclination angle sign estimation unit 124 determines the sign of the inclination angle of the inclined surface, which is required to remove the gravity acceleration from the acceleration measurement value output from the accelerometer 114. The inclination angle sign estimation unit 124 determines the sign of the inclination angle by using a difference between an altitude measurement value measured by the altimeter 116 in a previous period and an altitude measurement value measured in a current period.

The velocity calculation unit 126 calculates an actual velocity of the moving object. According to an exemplary embodiment of the present invention, the velocity calculation unit 126, under the control of the control unit 130, calculates the velocity of the moving object that moves on the inclined surface. The velocity calculation unit 126 calculates the pure movement acceleration of the moving object by using the altitude measurement value and the acceleration measurement value of the moving object measured by the sensor part 110. Hereinafter, a method for calculating a pure movement acceleration and velocity of a moving object that travels on an inclined surface will be described in detail with reference to FIG. 3.

The control unit 130 controls the whole operation of the velocity measuring apparatus 100 in a navigation system. In an exemplary embodiment of the present invention, the control unit 130 controls die accelerometer 114 and the altimeter 116 of the sensor part 110 to measure the acceleration and the altitude of the moving object, respectively.

Also, when the moving object travels on an inclined surface, the control unit 130 controls the gravity component calculation unit 122 to calculate the gravity component included in the acceleration measured by the accelerometer 114. The control unit 130 controls the inclination angle sign estimation unit 124 to determine the sign of the inclination angle of the inclined surface on which the moving object travels. The control unit 130 also controls the velocity calculation unit 126 to calculate the velocity of the moving object.

Figure 3:
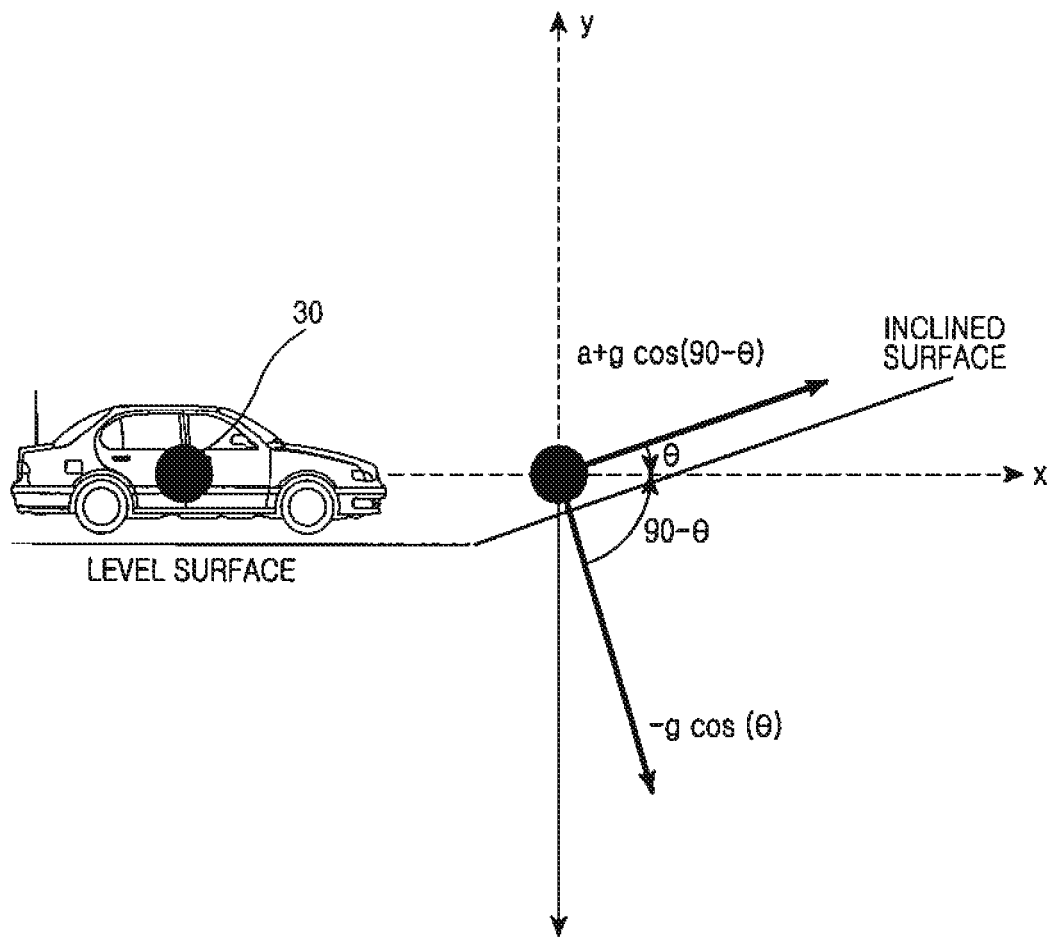
FIG. 3 is a view relating to calculation of an inclination angle of a road, on which a moving object is traveling, performed by an apparatus for measuring velocity of a moving object in a navigation system according to an exemplary embodiment of the present invention.

FIG. 3 is a view relating to a calculation of an inclination angle of a road, on which a moving object is traveling, performed by an apparatus for measuring velocity of a moving object in a navigation system according to an exemplary embodiment of the present invention.

Referring to FIG. 3, in order to estimate the inclination angle of the inclined surface, data from two independent accelerometers are required. The calculation method according to FIG. 3 includes two independent accelerometers mounted at right angles with each other (i.e., on X and Y-axes, respectively) on the moving object (e.g., an automobile). In FIG. 3, a line indicating the traveling direction of the moving object is in parallel with the axle connecting the front and rear parts of the moving object. θ denotes an inclination angle of an inclined surface, and is defined as an angle between a plane, which is perpendicular to the gravity acceleration, and the axle connecting the front and rear parts of the moving object. g denotes a constant of the gravity acceleration, and a denotes a pure movement acceleration of the moving object.

On the X-axis as shown in FIG. 3, a component of the acceleration a and a component of the gravity acceleration g cos(90−θ)(=g sin θ) are measured. On the Y-axis that is perpendicular to the direction of the acceleration, a component of the gravity acceleration −g cos θ is measured. If it is assumed that the measured values on X and Y-axes are $f_x$ and $f_y$, respectively, they can be expressed as in Equations (1) and (2).

$$f_x = a + g_x \quad (1)$$

$$f_y = g_y \quad (2)$$

In this cases $g_x$ and $g_y$ are the gravity accelerations g sin θ and −g cos θ measured on X and Y-axes, respectively. In order to obtain the pure movement acceleration a from Equation (1), it is required to obtain $g_x$. Accordingly, in order to obtain $g_x$, g cos θ is obtained as in Equation (3).

$$g \cos\theta = -g_y = f_y \quad (3)$$

It is assumed that the altimeter 116 measures the altitude of the moving object for the predetermined period, and outputs the altitude measurement value. If it is assumed that the current period for measuring the inclination angle in a state where the moving object moves is $t_k$ and the altitude measurement value at $t_k$ is $h_k$, the previous period may be denoted as $t_{k-1}$, and the altitude measurement value at $t_{k-1}$ may be denoted as $h_{k-1}$. The sign of the inclination angle θ of the inclined surface can be obtained as in Equation (4).

$$\text{sign}(\theta) = \text{sign}(h_k - H_{k-1}) \quad (4)$$

The sign of the inclination angle θ may be positive (+) or negative (−), depending on whether the moving object goes up or down on the inclined surface, i.e., whether the elevation of the object increases or decreases, respectively, as it moves along the inclined surface. In order to obtain the pure movement acceleration of the moving object that moves on the inclined surface, the navigation system according to an exemplary embodiment of the present invention must remove the gravity component acting on the moving object. The inclination angle sign estimation unit 124 determines a sign of the inclination angle θ according to whether the moving object goes up or down on the inclined surface, and the velocity calculation unit 126 removes the gravity component acting on the moving object in accordance with the determined sign of the inclination angle θ.

For example, if the altitude measurement value in a current period is greater than the altitude measurement value in a previous period, the sign of the inclination angle θ becomes positive (+), and in this case, the pure movement acceleration calculated by the calculation part 120 may be less than the acceleration measured by the accelerometer 114. By contrast, if the altitude measurement value in the current period is less than the altitude measurement value in the previous period, the sign of the inclination angle θ becomes negative (−), and in this case, the pure movement acceleration calculated by the calculation part 120 may be greater than the acceleration measured by the accelerometer 114.

From Equations (3) and (4), $g_x$ can be obtained as in Equation (5).

$$g_x = \text{sign}(\theta) = \text{sign}(\theta)(g^2 - (f_y)^2)^{\frac{1}{2}} \quad (5)$$

From Equation (5), the pure movement acceleration a of the moving object is obtained as in Equation (6).

$$a = f_x - g_x \quad (6)$$

Accordingly, if it is assumed that the velocity of the moving object in the current period $t_k$ is $V_k$, it can be obtained using Equation (7)

$$V_k = V_{k-1} + \int a \cdot \Delta t \quad (7)$$

where, $V_{k-1}$ is the velocity in the previous period $t_{k-1}$, and Δt is an integration time interval from the previous period to $t_{k-1}$ to the current period $t_k$. As described above, the velocity calculation unit 126 can calculate the pure movement acceleration and the velocity of the moving object.

Figure 4:
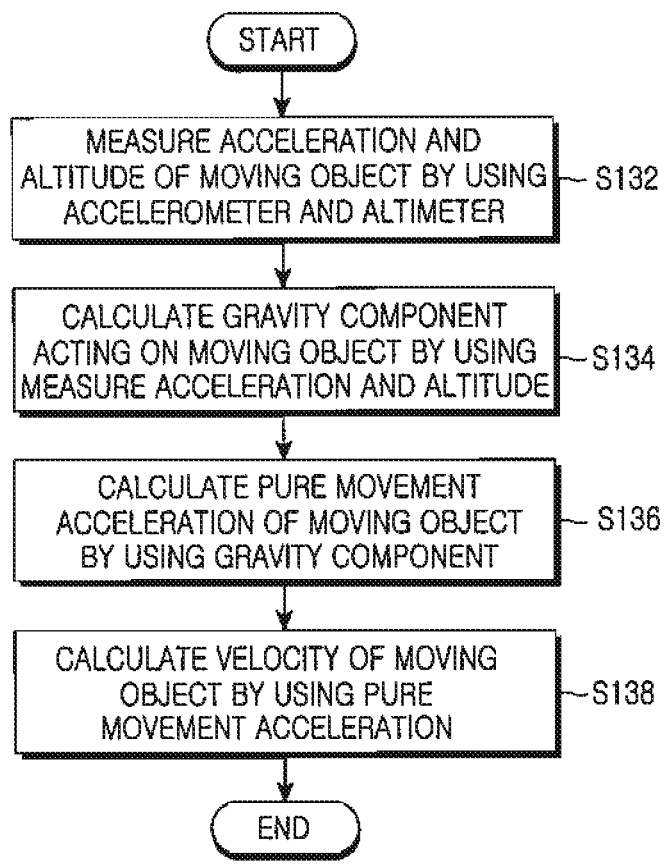
FIG. 4 is a flowchart illustrating a method for measuring velocity of a moving object in a navigation system according to an exemplary embodiment of the present invention.

FIG. 4 is a flowchart illustrating a method for measuring a velocity of a moving object in a navigation system according to an exemplary embodiment of the present invention.

The navigation system measures the acceleration and the altitude of the moving object by using the accelerometer 112 and the altimeter 116 of the sensor part 110, in step S132. The sensor part 110, under the control of the control unit 130, measures the acceleration and the altitude of the moving object for a predetermined period.

The gravity component calculation unit 122 calculates the gravity component acting on the moving object by using the measured acceleration and altitude, in step S134. The velocity calculation unit 126 calculates the pure movement acceleration of the moving object using the gravity component, in step S136. The calculation of the pure movement acceleration is described hereinabove with reference to FIG. 3.

The velocity calculation unit 126 calculates the velocity of the moving object by using the pure movement acceleration, in step S138. Preferably, the velocity calculation unit 126 calculates the velocity of the moving object by integrating the calculated movement velocity over time.

Figure 5:
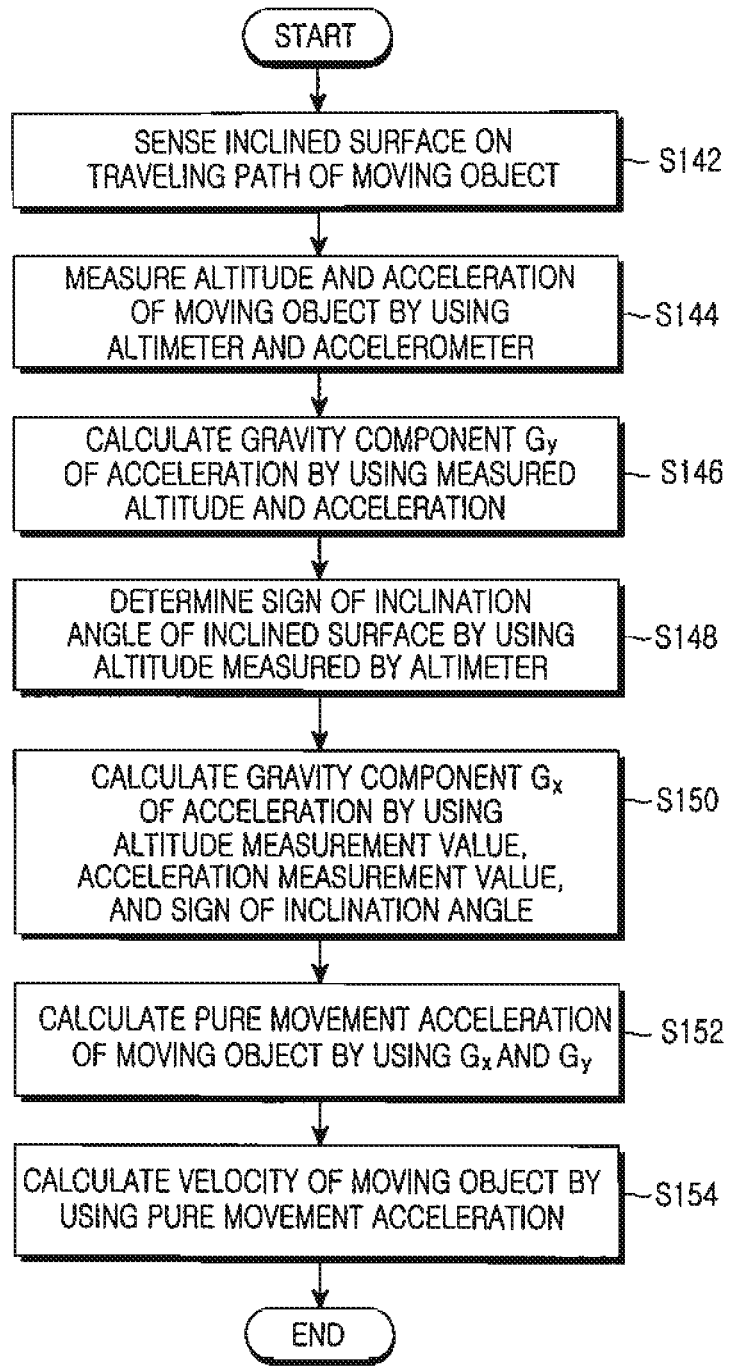
FIG. 5 is a flowchart illustrating a method for measuring velocity of a moving object in a navigation system according to another exemplary embodiment of the present invention.

FIG. 5 is a flowchart illustrating a method for measuring velocity of a moving object in a navigation system according to another exemplary embodiment of the present invention.

Referring to FIGS. 2 and 5, the sensor part 110 senses the inclined surface of the traveling path of the moving object by using the sensors provided therein, in step S142. According to the exemplary embodiment of the present invention, the sensor part 110, under the control of the control unit 130, senses the inclined surface by using the altimeter 116. While the moving object travels on die inclined surface, the altitude measurement value of the moving object measured by the altimeter 116 is varies as time passes. Accordingly, if the altitude measurement value output from the altimeter 116 becomes large or small for the predetermined period, the control unit 130 determines that the moving object is moving on the inclined surface. The sensor part further includes an inclinometer (not illustrated) that can sense the inclined surface.

The sensor part 110, under the control of the control unit 130, measures the altitude and the acceleration of the moving object by using the altimeter 116 and the accelerometer 114, in step S144, and outputs the altitude measurement value and the acceleration measurement value. The acceleration of the moving object that is measured on the inclined surface includes the gravity components $g_x$ and $g_y$. In order to measure the velocity of the moving object, the pure movement acceleration, from which the gravity components have been removed, is required.

The gravity component calculation unit 122 of the calculation part 120, under the control of the control unit 130, calculates the gravity component $g$, of the acceleration by using the measured altitude measurement value and acceleration measurement value, in step S146.

The inclination angle sign estimation unit 124 determines the sign of the inclination angle of the inclined surface by using the altitude measurement value according to the movement of the moving object measured by the altimeter 116, in step S148. The inclination angle signal estimation unit 124, for example, determines the sign of the inclination angle is negative (−) if the altitude measurement value measured by the altimeter 116 decreases as time passes, while the inclination angle signal estimation unit 124 determines the signal of the inclination angle is positive (+) if the altitude measurement value increases as time passes.

The gravity calculation unit 122 calculates the gravity component $g$, of the movement acceleration by using the measured altitude measurement value, acceleration measurement value, and sign of the inclination angle, in step S150. The velocity calculation unit 126 calculates the pure movement acceleration of the moving object by using $g_x$ and $g_y$, in step S152.

The velocity calculation unit 126 calculates the velocity of the moving object by using the calculated pure movement acceleration, in step S154. Since the velocity of the moving object is obtained by integrating the acceleration, the velocity calculation unit 126 can calculate the velocity of the moving object by integrating the pure movement acceleration.

As described above, according to the present invention, the accuracy of the velocity measurement and position estimation of a moving object in a navigation system can be increased.

Also, since the road inclination angle on the traveling path is measured by using the altimeter, accumulation of an error component occurring in the velocity measuring and calculating process resulting from using a gyro can be prevented.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A navigation apparatus for measuring a velocity of a moving object, comprising:
    an acceleration sensor configured to measure an acceleration of a moving object and output an acceleration measurement value;
    an altimeter configured to measure an altitude of the moving object and output an altitude measurement value; and
    a calculation part configured to:
        determine a sign of an inclination angle of an inclined surface on which the moving object travels using the altitude measurement value,
        obtain a gravity component included in the acceleration measurement value,
        calculate a pure movement acceleration of the moving object by removing the gravity component from the acceleration measurement value, and
        calculate the velocity of the moving object by using the pure movement acceleration,
    wherein the altimeter measures the altitude of the moving object for a predetermined time period, and outputs the altitude measurement value, and
    wherein the calculation part is further configured to determine the sign of the inclination angle of the inclined surface by using the altitude measurement value for the predetermined time period.

2. The navigation apparatus of claim 1, wherein the sign of the inclination angle of the inclined surface is determined by using a difference between an altitude measurement value of the moving object in a current time period and an altitude measurement value of the moving object in a previous time period, according to $$\text{sign}(\theta)=\text{sign}(h_k-H_{k-1}),$$

where $\theta$ is the inclination angle of the inclined surface, $h_k$ is the altitude measurement value in the current time period, and $h_{k-1}$ is the altitude measurement value in the previous time period.

3. The navigation apparatus of claim 1, wherein the calculation part is further configured to calculate the velocity of the moving object by integrating the pure movement acceleration of the moving object.

* * * * *